(12) United States Patent
Strahl et al.

(10) Patent No.: US 11,688,968 B2
(45) Date of Patent: Jun. 27, 2023

(54) THREE DIMENSIONAL PRINTED ELECTRICAL CONNECTOR

(71) Applicant: Amphenol Corporation, Wallingford, CT (US)

(72) Inventors: Erik Strahl, Unadilla, NY (US); Kyle Matthew Tompkins, Binghamton, NY (US); Alyssa R. Merrill, Binghamton, NY (US)

(73) Assignee: AMPHENOL CORPORATION, Wallingford, CT (US)

( * ) Notice: Subject to any disclaimer, the term of this patent is extended or adjusted under 35 U.S.C. 154(b) by 292 days.

(21) Appl. No.: 17/072,382

(22) Filed: Oct. 16, 2020

(65) Prior Publication Data
US 2022/0123498 A1 Apr. 21, 2022

(51) Int. Cl.
| | |
|---|---|
| *H01R 13/52* | (2006.01) |
| *H01R 13/502* | (2006.01) |
| *H01R 13/641* | (2006.01) |
| *H01R 13/629* | (2006.01) |
| *B33Y 80/00* | (2015.01) |
| *B33Y 70/00* | (2020.01) |

(52) U.S. Cl.
CPC ....... *H01R 13/5205* (2013.01); *H01R 13/502* (2013.01); *H01R 13/521* (2013.01); *H01R 13/629* (2013.01); *H01R 13/641* (2013.01); *B33Y 70/00* (2014.12); *B33Y 80/00* (2014.12)

(58) Field of Classification Search
CPC .............. H01R 13/5205; H01R 13/502; H01R 13/521; H01R 13/629; H01R 13/641; H01R 13/4226; H01R 13/5219; H01R 13/5208; H01R 13/50; H01R 43/18; B33Y 70/00; B33Y 80/00; B29C 64/10
See application file for complete search history.

(56) References Cited

U.S. PATENT DOCUMENTS

| | | | |
|---|---|---|---|
| 5,827,084 A | 10/1998 | Biernath | |
| 9,118,138 B2* | 8/2015 | Bianca | H01R 13/424 |
| 9,802,449 B1* | 10/2017 | Lewellyn | B60C 29/068 |
| 10,044,175 B1 | 8/2018 | Sloat | |
| 10,116,096 B1 | 10/2018 | Anderson et al. | |
| 10,396,485 B1* | 8/2019 | Smoll | H01R 13/41 |
| 2014/0308846 A1* | 10/2014 | Bianca | H01R 13/506 |
| | | | 439/595 |
| 2018/0034183 A1 | 2/2018 | Myong et al. | |
| 2018/0040986 A1* | 2/2018 | Tsang | H01R 13/648 |
| 2020/0153155 A1* | 5/2020 | Mears | B23P 11/005 |
| 2021/0159633 A1* | 5/2021 | Storione | H01R 12/714 |
| 2021/0257770 A1* | 8/2021 | Martin | H01R 13/50 |
| 2022/0123498 A1* | 4/2022 | Strahl | H01R 13/521 |

FOREIGN PATENT DOCUMENTS

| | | | |
|---|---|---|---|
| WO | WO 2016/167770 | 10/2016 | |
| WO | WO-2019193564 A1 * | 10/2019 | ........... H01R 12/714 |
| WO | WO 2019/236976 | 12/2019 | |

* cited by examiner

*Primary Examiner* — Abdullah A Riyami
*Assistant Examiner* — Nader J Alhawamdeh
(74) *Attorney, Agent, or Firm* — Cantor Colburn LLP

(57) ABSTRACT

A three-dimensional (3D) printed electrical connector includes an insert component, at least a first sealing member, and a shell. The insert component includes a body adapted for 3D printing. The body has first and second ends and includes a cavity penetrating the body along a longitudinal axis of the body. The first sealing member is associated with the insert component and is adapted for 3D printing. The shell at least partially encloses the insert component.

23 Claims, 12 Drawing Sheets

THREE DIMENSIONAL PRINTED ELECTRICAL CONNECTOR

BACKGROUND

This disclosure relates generally to the field of electrical connectors and more particularly to an electrical connector manufactured by additive manufacturing technology or three-dimensional (3D) printing.

Electrical connectors have a broad range of applications, including applications in electrical and electronic devices used in harsh environments. In additive manufacturing technology, materials are added to form an object by assist of, e.g., computer-aided design (CAD) software and hardware. However, challenges remain for electrical connectors made by using the additive manufacturing technology.

SUMMARY

An aspect of this disclosure is a three-dimensional printed electrical connector includes an insert component, at least a first sealing member, and a shell. The insert component includes a body adapted for 3D printing. The body has first and second ends and includes a cavity penetrating the body along a longitudinal axis of the body. The first sealing member is associated with the insert component and is adapted for 3D printing. The shell at least partially encloses the insert component.

In some examples, the body of the insert component is formed of rigid epoxy resin.

In some examples, the cavity includes at least two cavity portions with different dimensions and at least one corner between the at least two cavity portions. The insert component includes a clearance structure at the at least one corner.

In some examples, the clearance structure has an annular shape. A cross-section of the clearance structure across a plane parallel to the longitudinal axis includes an arc.

In some examples, the insert component includes a plurality of clearance structures in the cavity; and centers of two adjacent clearance structures of the plurality of clearance structures have a distance therebetween in a direction along or parallel to the longitudinal axis.

In some examples, the body of the insert component includes a dielectric material.

In some examples, the insert component further includes a vent hole coupling the cavity to a space outside the body.

In some examples, the cavity is a first cavity. The insert component further includes additional cavities each penetrating the body along the longitudinal axis of the body. The insert component further includes a plurality of passage paths coupling the first and additional cavities.

In some examples, the first sealing member has a first surface and a second surface. The second surface of the first sealing member being in contact with the first end of the insert component.

In some examples, the first sealing member includes a plurality of tower structures on a first surface of the first seal, and each of the plurality of tower structures includes a base.

In some examples, the connector further include a second sealing member. The second sealing member has a first surface and a second surface. The first surface of the second sealing member are in contact with the second end of the insert component.

In some examples, both of the first and second sealing members are elastomeric and insulating.

In some examples, the second sealing member is at least twice as thick as the first sealing member.

In some examples, the second sealing member includes a cavity for an electrical contact and penetrating the second sealing member along the longitudinal axis and has, in the cavity of the second sealing member, a singular wiper adjacent to the second surface of the second sealing member.

In some examples, the singular wiper has an annular shape.

In some examples, a cross-section of the singular wiper across a plane parallel to the longitudinal axis includes an arc.

In some examples, the cavity of the second sealing member includes a cavity portion adjacent to the singular wiper; and an inner diameter of the singular wiper is smaller than an inner diameter of the cavity portion.

In some examples, the second sealing member includes a body and a cavity for an electrical contact, wherein the cavity penetrates the body of the second sealing member; and the second sealing member further includes a plurality of pockets in the body of the second sealing member, wherein the plurality of pockets are separated from the cavity.

In some examples, the plurality of pockets follows a lattice order.

In some examples, the plurality of pockets are arranged randomly.

In some examples, the second sealing member further includes a corrugation structure between the cavity and one or more of the plurality of pockets.

Another aspect of this disclosure is a three-dimensional printed electrical connector. The three-dimensional printed electrical connector includes an insert component. The insert component includes a body with first and second ends, where the body is adapted for 3D printing and is formed of rigid epoxy resin; and a cavity penetrating the body along a longitudinal axis of the body; and a disposable part at the second end of the body.

In some examples, the disposable part includes a cone-shaped hole.

In some examples, the cavity includes at least two cavity portions with different dimensions and at least one corner between adjacent cavity portions, and the insert component includes a clearance structure at the at least one corner.

Another aspect of this disclosure is a three-dimensional printed electrical connector. The three-dimensional printed electrical connector includes an insert component. The insert component includes a body and a cavity penetrating the body along a longitudinal axis of the body. The body is adapted for 3D printing and has first and second ends. The cavity includes at least two cavity portions with different dimensions and at least one corner between adjacent cavity portions. The insert component includes a clearance structure at the at least one corner.

In some examples, a first sealing member has a first surface and a second surface, and the second surface of the first sealing member is in contact with the first end of the insert component.

In some examples, a second sealing member has a first surface and a second surface, and the first surface of the second sealing member is in contact with the second end of the insert component.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
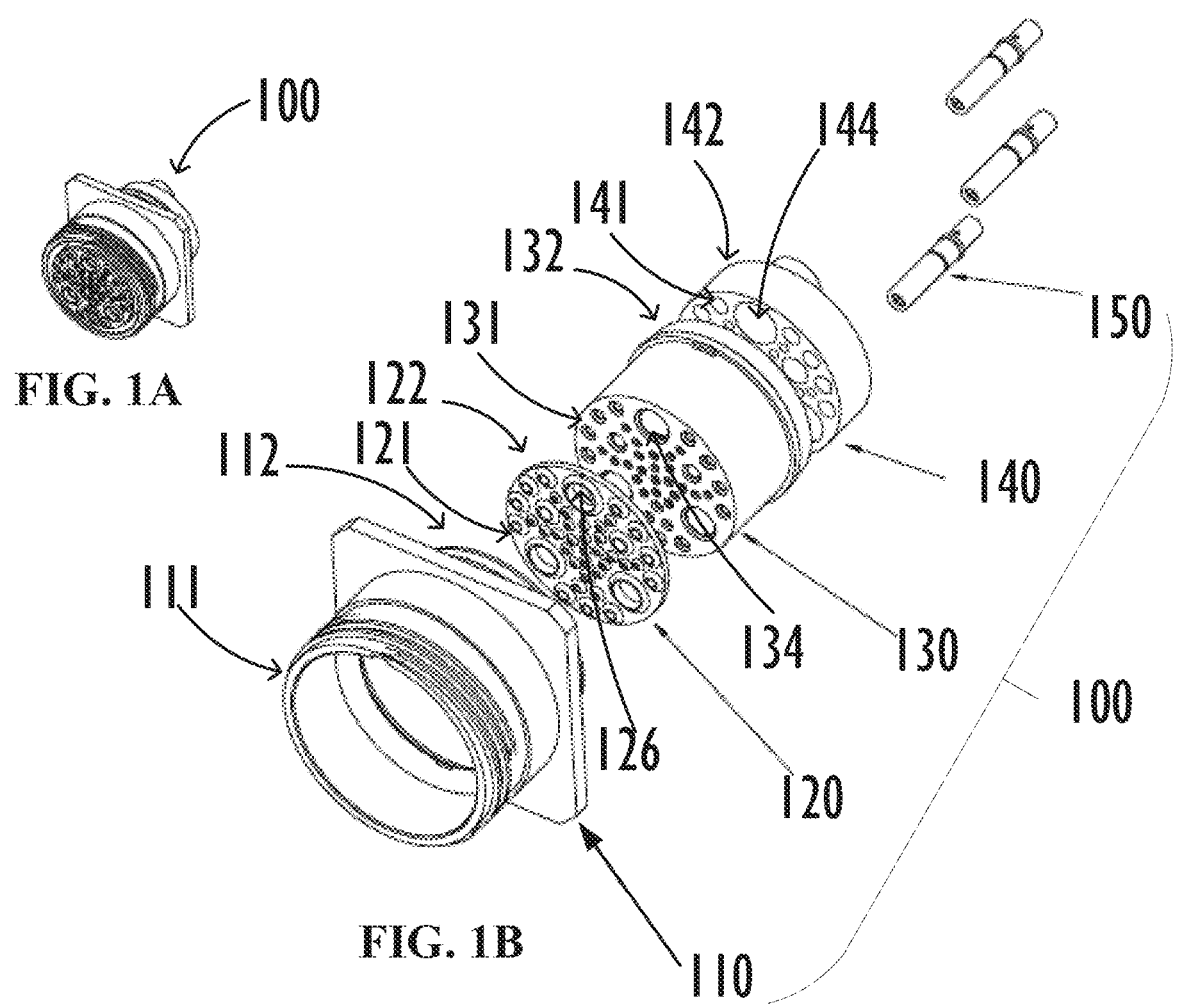
FIGS. 1A and 1B illustrate assembled and exploded views, respectively, of an exemplary three-dimensional (3D) printed electrical connector, according to one example of the present disclosure.

The present disclosure includes electrical connectors that can be manufactured using additive manufacturing technology, such as commercially available digital additive manufacturing technology. The electrical connectors may be ruggedized, and may be used in harsh environments such as military and aerospace environments.

FIGS. 1A and 1B illustrates assembled and exploded views, respectively, of an exemplary three-dimensional (3D) printed electrical connector 100. The electrical connector 100 includes a shell 110, a sealing member 120, an insert component 130, another sealing member 140, and a plurality of electrical contacts 150. The shell 110 may at least partially enclose one or more of the sealing member 120, the insert component 130, the sealing member 140, and the plurality of electrical contacts 150, when components of the electrical connector 100 are assembled. The shell 110 has a first end 111 and an opposite second end 112. The sealing member 120 has a first surface 121 and a second surface 122. The insert component 130 has a first end 131 and a second end 132. The sealing member 140 has a first surface 141 and a second surface 142. The second surface 122 of the sealing member 120 is generally next to the first end 132 of the insert component 130 and the first surface 141 of the sealing member 140 is generally next to the second surface 132 of the insert component 130. The sealing member 120 may be a front sealing member and the sealing member 140 may be a rear sealing member.

When the components of the electrical connector 100 are assembled, the first surface 121 of the sealing member 120 may be coplanar with the first end 111 of the shell 110, or may be in close proximity with the first end 111 of the shell 110; and the second surface 122 of the sealing member 120 may be in contact with the first end 131 of the insert component 130; and the first end 132 of the insert component 130 may be in contact with the first surface 141 of second sealing member 140. The plurality of electrical contacts 150 may be inserted into cavities or holes, e.g., 126, 134, and 144, in the sealing member 120, the insert component 130, and the sealing member 140. Cavities of the insert component 130 (e.g., 134) are aligned with cavities of the sealing member 120 (e.g., 126) and cavities of the sealing member 140 (e.g., 144) coaxially for receiving the plurality of electrical contacts 150. When the components of the electrical connector 100 are assembled, the sealing member 120, the insert component 130, the sealing member 140, the shell 110, the plurality of electrical contacts 150 may be co-axial, e.g., having the same longitudinal axes. The electrical connector may be adapted for additive manufacturing (such as 3D printing). For example, the sealing member 120, the insert component 130, and/or the sealing member 140 may be adapted for additive manufacturing as described below. Both of the sealing members 120 and 130 may be elastomeric and insulating. In an example, the sealing member 140 may be at least twice as thick as the sealing member 120. The thickness of the sealing member 140 is the distance between its first and second surfaces 141 and 142 of the sealing member 140, and the thickness of the sealing member 120 is the distance between its first and second surfaces 121 and 122 of the sealing member 120.

Figure 2:
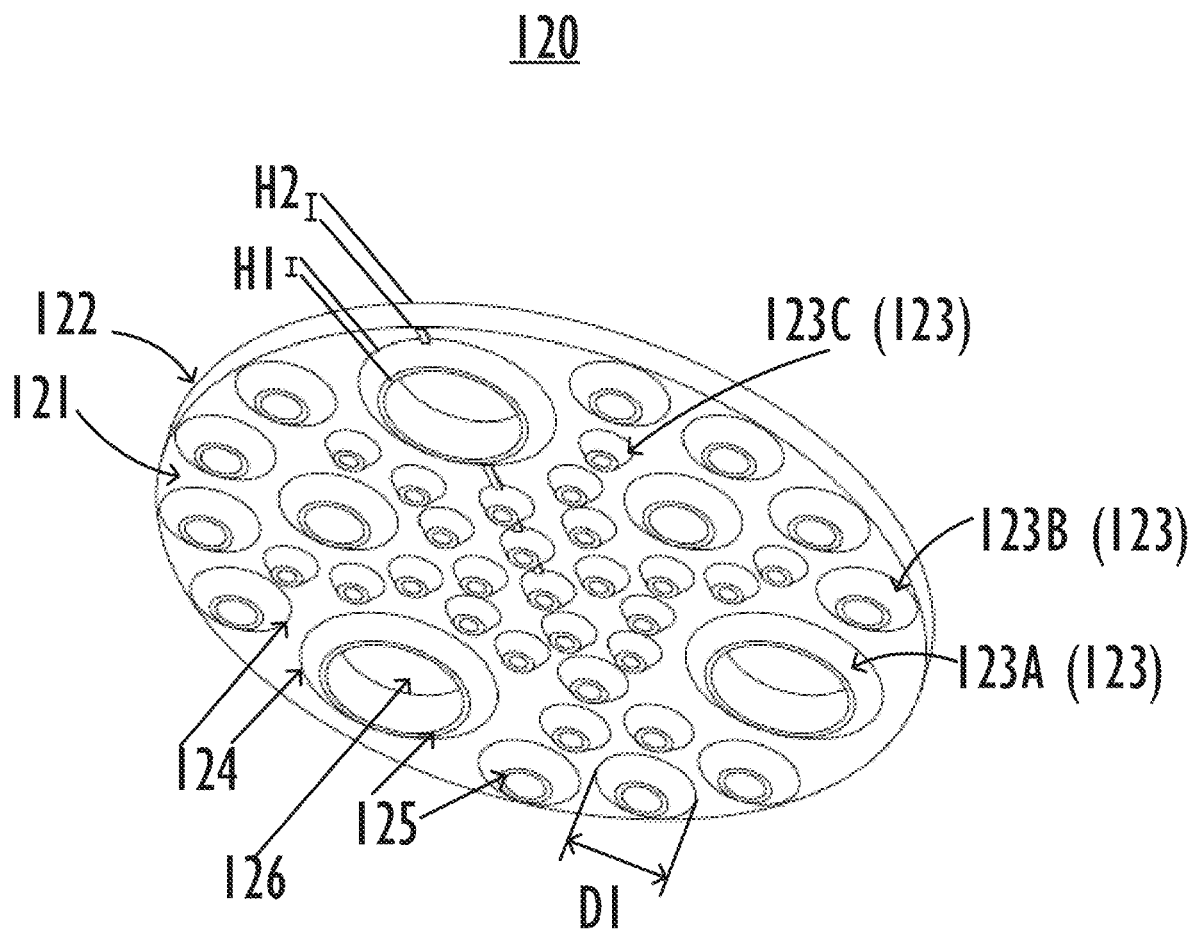
FIG. 2 illustrates a perspective view of an exemplary sealing member shown in FIG. 1B.

FIG. 2 illustrates a perspective view of sealing member 120 of FIG. 1. The sealing member 120 includes the first surface 121, the second surface 122, and a plurality of tower structures 123a, 123b, and 123c on the first surface 121, and a plurality cavities 126 for electrical contacts and penetrating the tower structures 123a and the first sealing member 120. Each of the towers 123a, 123b, 123c has a base 124, a tip surface 125 that is at a height H1 from the base 124. The height H1 is a distance from the plane of the base 124 to the plane of the tip surface 125. The thickness H2 is a distance from the second surface 122 to the first surface 121. The base 124 has a base diameter D1. To adapt the sealing member 120 for additive manufacturing, such as three-dimensional (3D) printing, the base diameter D1 may be increased, the height H1 may be decreased, and the thickness H2 may be increased. Accordingly, the robustness of the parts of the sealing member 120 may be increased, e.g., in their uncured state, so as to facilitate handling and removal from additive processing equipment, and distortion such as warping and shrinkage may be prevented or reduced during post processing, e.g., baking and/or curing. The tower 123a may have a larger base diameter D1 than the tower 123b or the tower 123c. The tower 123a may have a larger height H1 than the tower 123b or the tower 123c.

Figure 3:
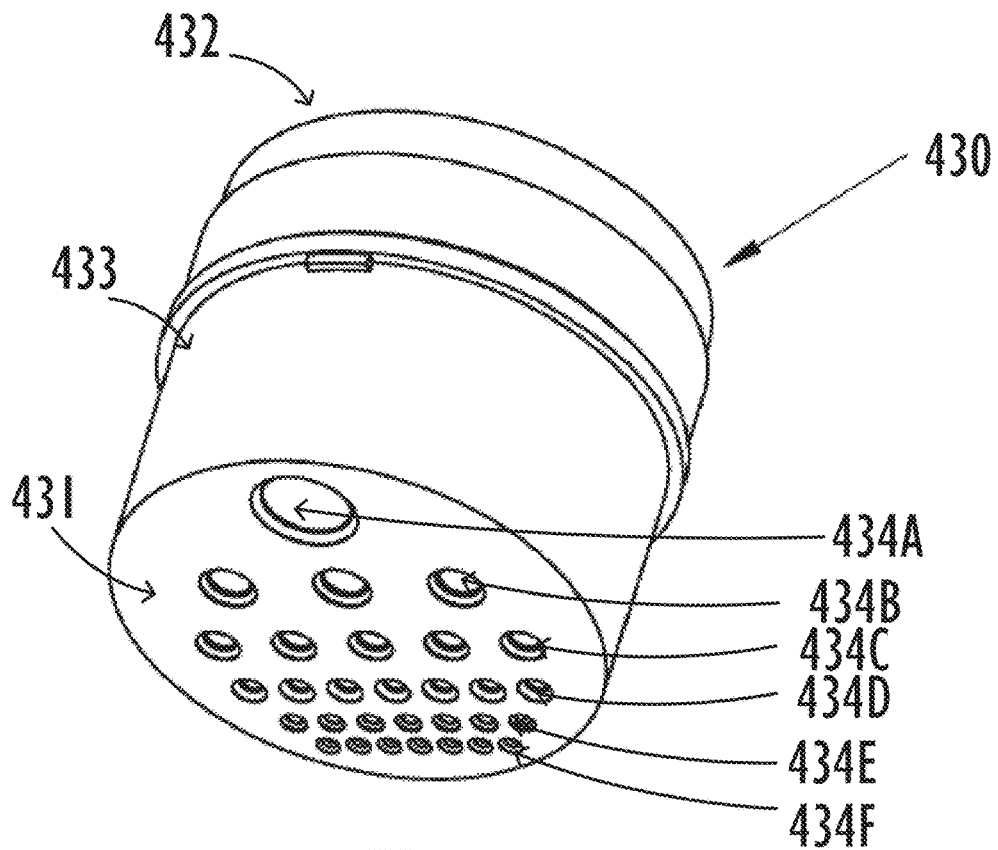
FIG. 3 illustrates a perspective view of another exemplary insert component according to the present disclosure.
Figure 4:
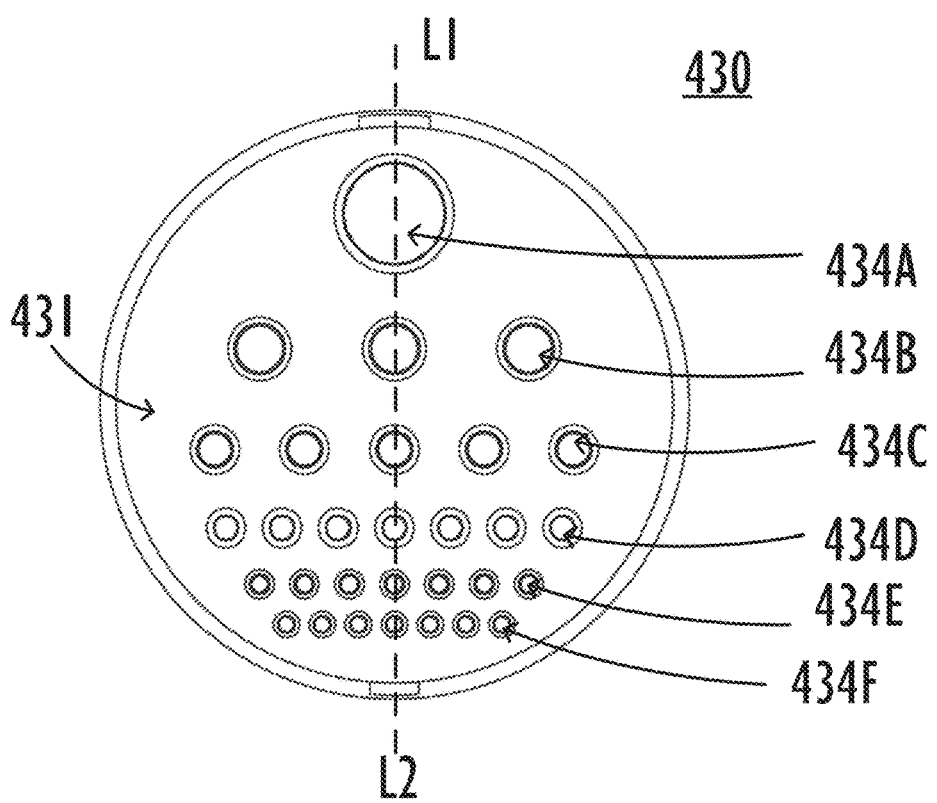
FIG. 4 illustrates an elevational view of the exemplary insert component shown in FIG. 3.
Figure 5:
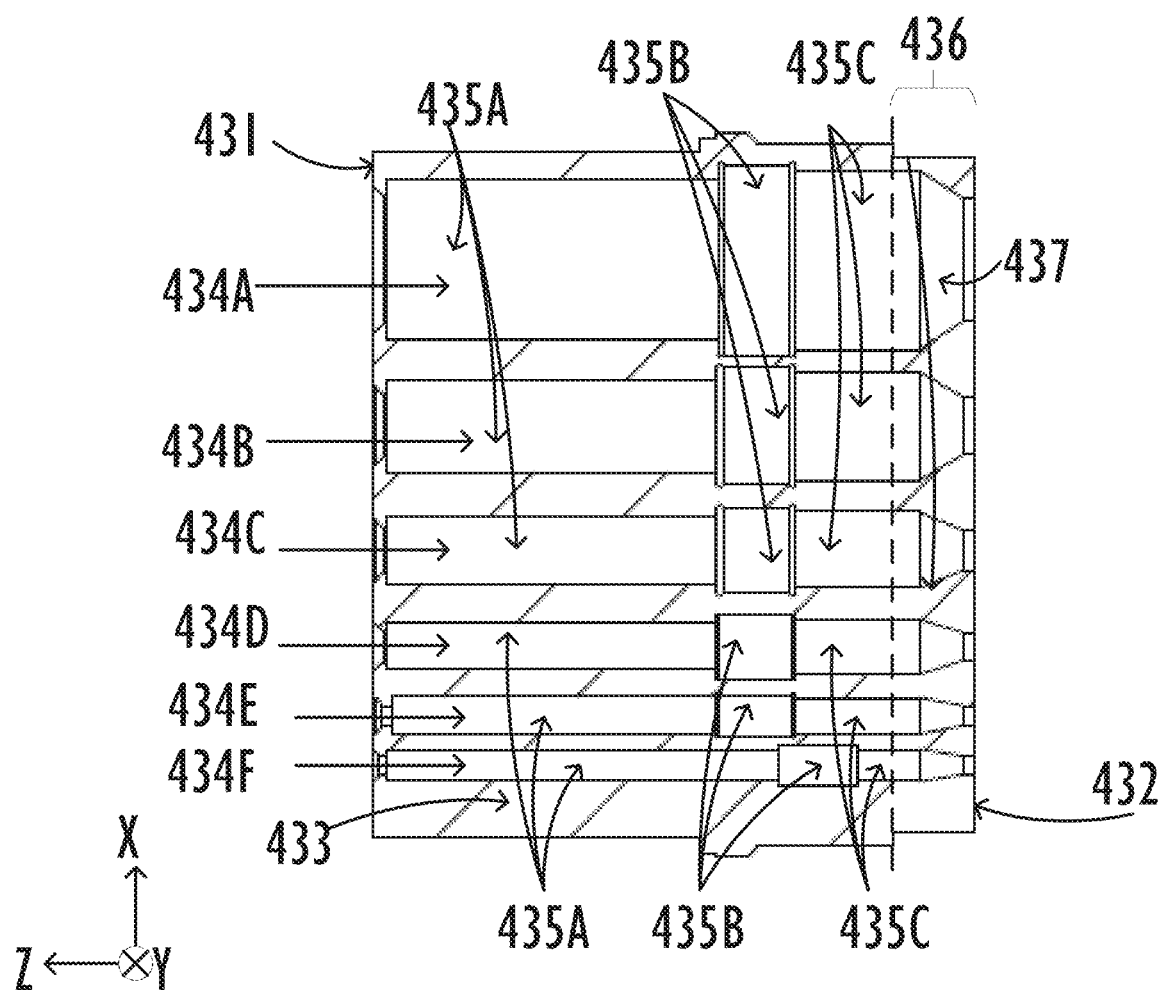
FIG. 5 illustrates a cross-sectional view of the exemplary insert component shown in FIG. 4.

FIG. 3 illustrates a perspective view of another exemplary insert component 430. FIG. 4 illustrates an elevational view of the exemplary insert component 430 shown in FIG. 3. FIG. 5 illustrates a cross-sectional view of the exemplary insert component 430 shown in FIG. 4 across L1-L2. Referring to FIGS. 3 to 5, the insert component 430 generally includes a component body 433 and a plurality of cavities 434a, 434b, 434c, 434d, 434e and 434f, each penetrating the component body 433 along a axes generally parallel to the longitudinal axis of the component body 433. The first end 431 and the second end 432 of the component body may have substantially flat faces.

The component body 433 may include a dielectric material. For example, the component body 433 may include rigid epoxy resin with a high heat deflection temperature (HDT), insulation resistance, low shrinkage, toughness, chemical resistance, and high resolution for additive manufacturing such as 3D printing.

The cavities 434a to 434f each may include one or more cavity portions, some of which may be further designated as 435a, 435b, and 435c. Adjacent cavity portions may have different dimensions. The cavity portion 435b may have a larger in-plane dimension than the cavity portion 435a or the cavity portion 435c. For example, the cavity portion 435b may have a larger diameter than the cavity portion 435a or the cavity portion 435c. In another example, the cavity portion 435b may have a smaller length than the cavity portion 435a or the cavity portion 435c, along the longitudinal axis of the component body 433. A coordinate system is shown in FIG. 5, in which X-axis, Y-axis, and Z-axis are orthogonal to each other. Z-axis may be parallel to the longitudinal axis of the component body 433, and may be perpendicular to the X-Y plane defined by X-axis and Y-axis. X-axis and Y-axis each may be an in-plane axis. A dimension in or parallel to a plane (such as X-Y plane) that is perpendicular to the longitudinal axis may be an in-plane dimension.

In some examples, the insert component 430 further includes a disposable part 436 at the second end 432 of the insert component 430. The disposable part 436 may include a plurality holes 437 sized to correspond to the cavities 434a, 434b, 434c, respectively. The holes 437 may have a cone shape, and may be directly connected to the respective cavity 434a, 434b, 434c and form a portion of the cavity. The disposable part 436 may prevent or remove distortion of the insert component 430 in additive manufacturing processes and post-printing processes. Integral supports (not shown in FIG. 5) may be attached to the disposable part 436 during the additive manufacturing process, and the supports may create localized distortions when removed. Further, such distortions may be removed by removing the disposable part 436, so as to create a smooth surface for the insert component to facilitate bonding of the insert component with a sealing member, such as a rear sealing member. In other examples, the insert component 430 does not include the disposable part 436.

Figure 6:
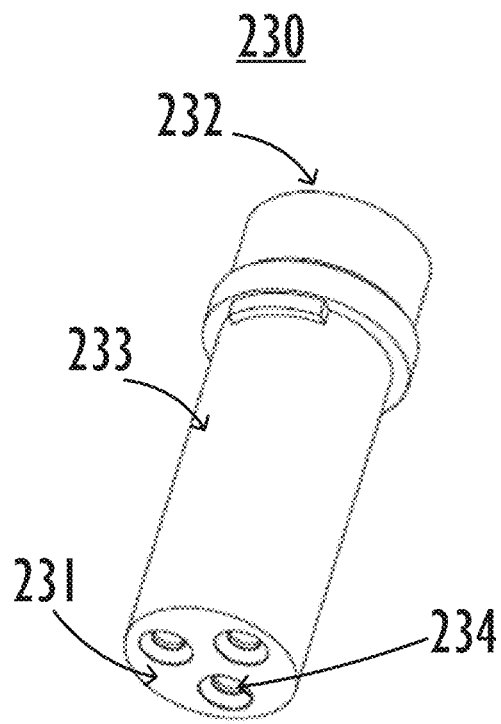
FIG. 6 illustrates a perspective view of another exemplary insert component according to the present disclosure.
Figure 7:
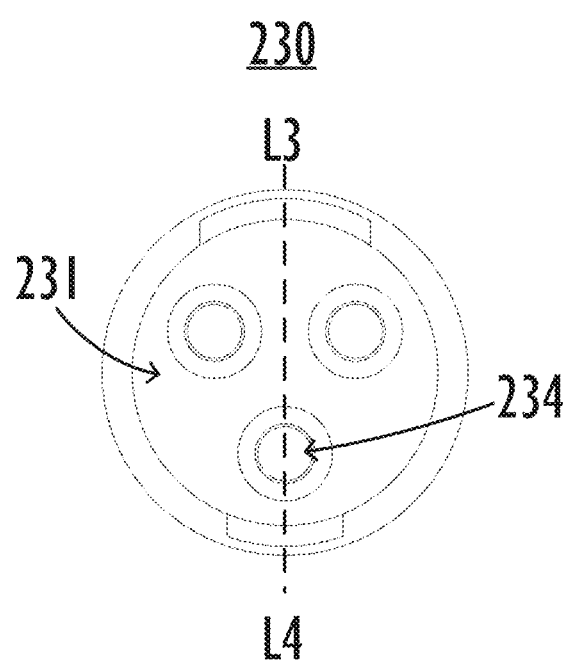
FIG. 7 illustrates an elevational view of the exemplary insert component shown in FIG. 6.
Figure 8:
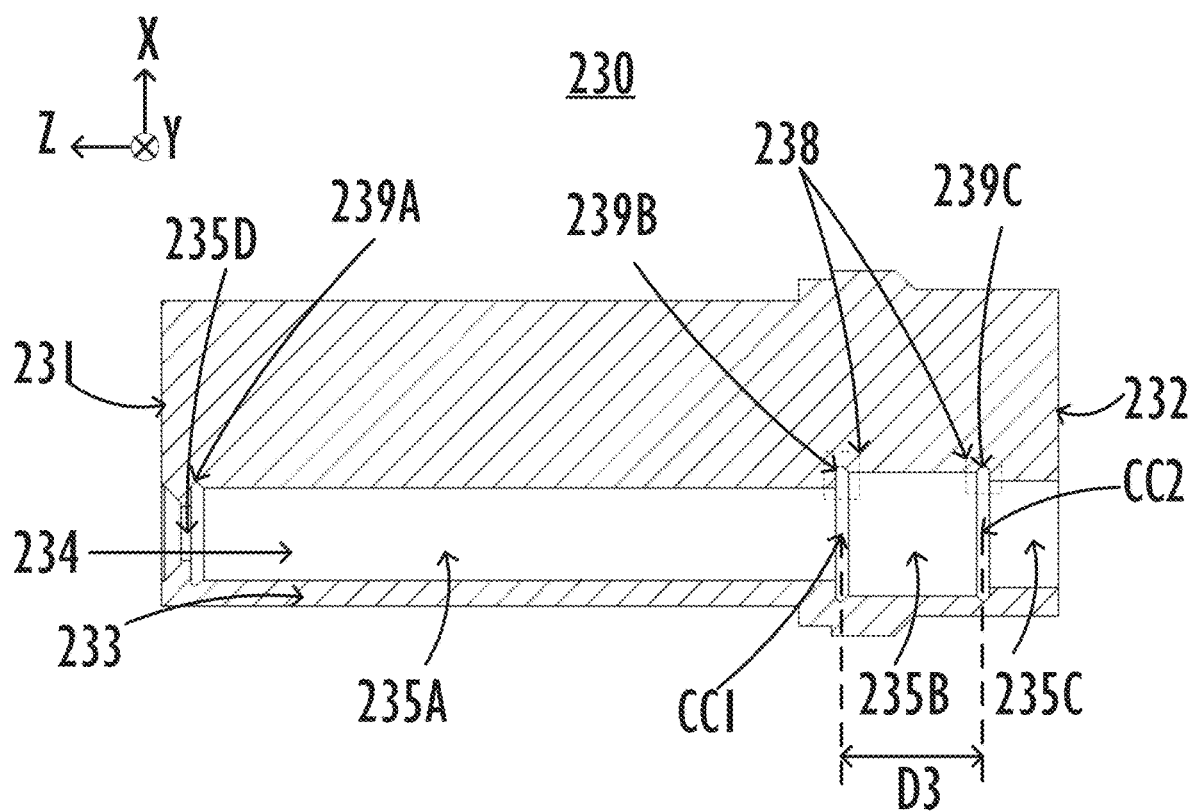
FIG. 8 illustrates a cross-sectional view of the exemplary insert component shown in FIG. 7.

FIG. 6 illustrates a perspective view of another exemplary insert component 230 of the present disclosure. FIG. 7 illustrates an elevational view of the exemplary insert component 230 shown in FIG. 6. FIG. 8 illustrates a cross-sectional view of the exemplary insert component 230 shown in FIG. 7 across L3-L4. Referring to FIGS. 6 to 8, the insert component 230 generally includes a component body 233 and a plurality of cavities 234 for receiving electrical contacts, and each cavity 234 penetrates the component body 233 along a longitudinal axis of the component body 233. The component body 233 has a first end 231 and a second end 232.

The cavity 234 may include one or more cavity portions 235a, 235b, 235c. Adjacent cavity portions 235a, 235b, 235c may have different dimensions. The cavity portion 235b may have a larger in-plane dimension than the cavity portion 235a or the cavity portion 235c. For example, the cavity portion 235b may have a larger diameter than the cavity portion 235a or the cavity portion 235c. And cavity portion 235a may be longer than either cavity portion 235b or 235c. Cavity portion 235a may also include a lead-in portion 235d.

In some examples, the cavity portions 235b and 235c may include one or more corners 238 between adjacent cavity portions and/or between adjacent cavity and lead-in portions. The insert component 230 may further include clearance structures 239a, 239b and 239c, Clearance structure 239a may be between lead-in portion 235d and the cavity portion 235a and the clearance structures 239b and 239c may be located at one of the corners 238 of adjacent cavity portions. For example, the clearance structure 239b is at the corner 238 of the two adjacent cavity portions 235a and 235b; and the clearance structure 239c is at the corner 238 of the two adjacent cavity portions 235b and 235c. The clearance structure 239b may have a annular shape, e.g., across a plane perpendicular to the longitudinal axis of the component body 233 such as X-Y plane. A cross-section of the clearance structure (239a, 239b, 239c) across a plane parallel to the longitudinal axis may include an arc. In some examples, the plurality of clearance structures 239a, 239b, and 239c each may have a ring shape or an annular shape, and centers of two adjacent clearance structures may have a distance therebetween in a direction along or parallel to the longitudinal axis of the insert component 230 (e.g., along Z-axis). For example, the center CC1 of the clearance structure 239b and the center CC2 of the clearance structure 239c have a distance D3 along Z-axis between the two centers CC1 and CC2. The component body 233 may be adapted for additive manufacturing by adding the clearance structures 239 at corners 238 to accommodate excess additive materials or buildup in the additive manufacturing processes.

Figure 9:
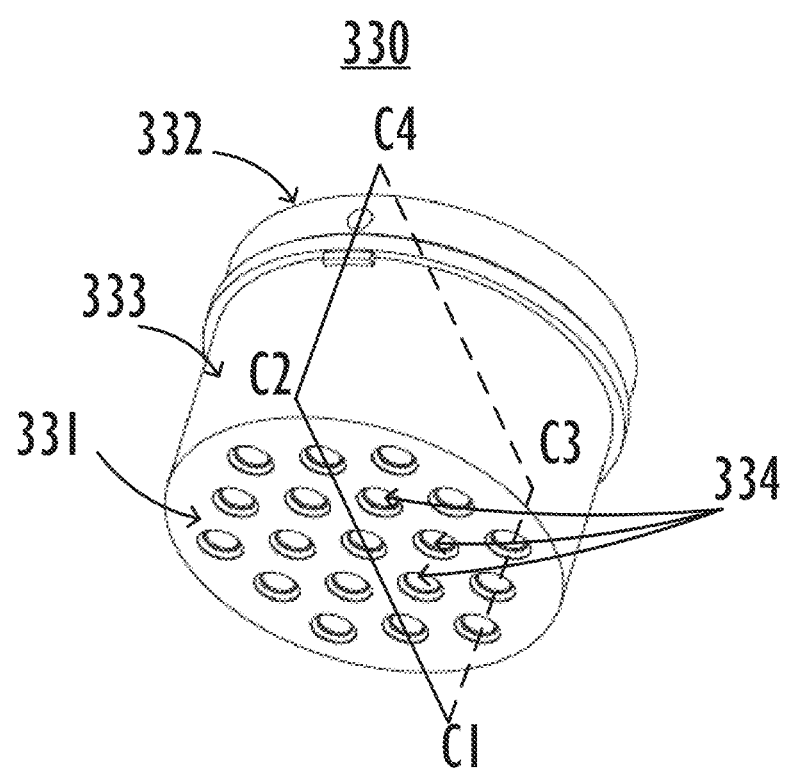
FIG. 9 illustrates a perspective view of another exemplary insert component according to the present disclosure.
Figure 10:
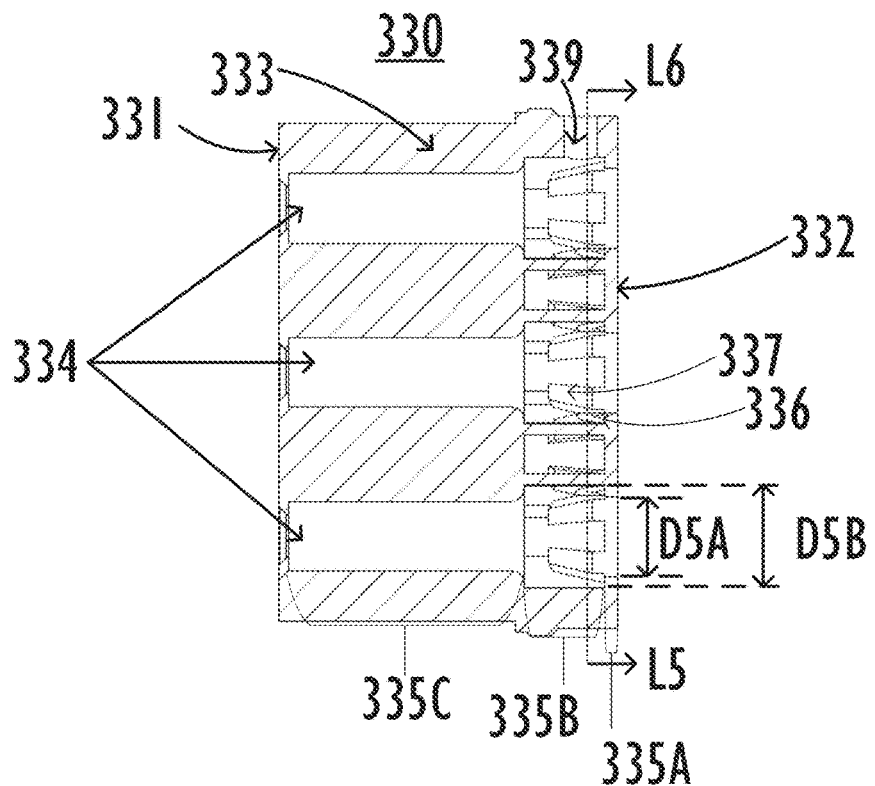
FIG. 10 illustrates a cross-sectional view of the exemplary insert component shown in FIG. 9.
Figure 11A:
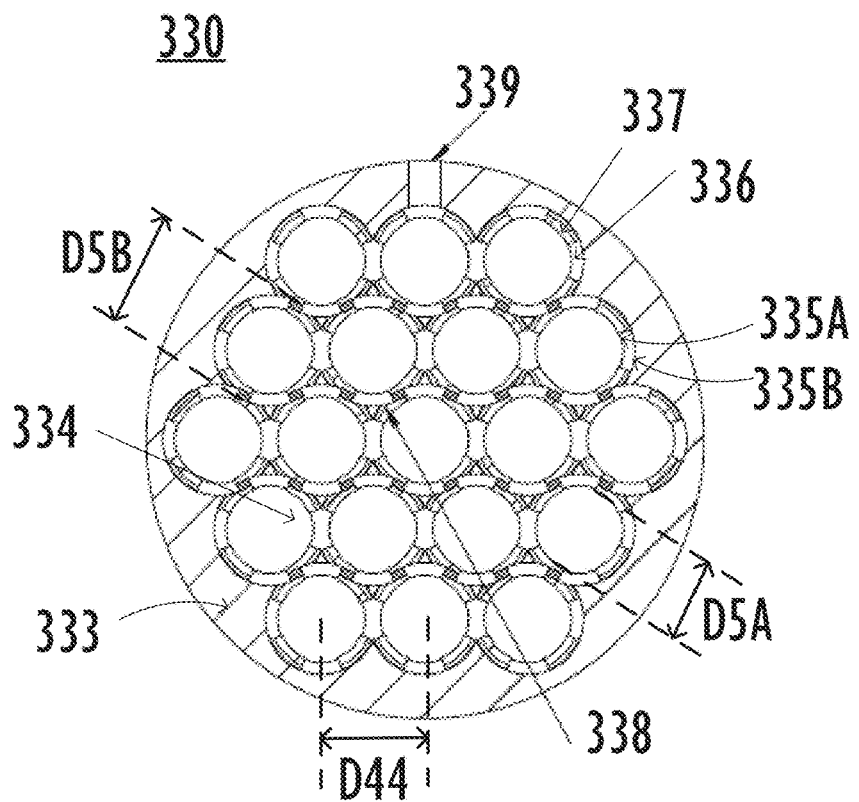
FIG. 11A illustrates a cross-sectional view of the exemplary insert component shown in FIG. 10.
Figure 11B:
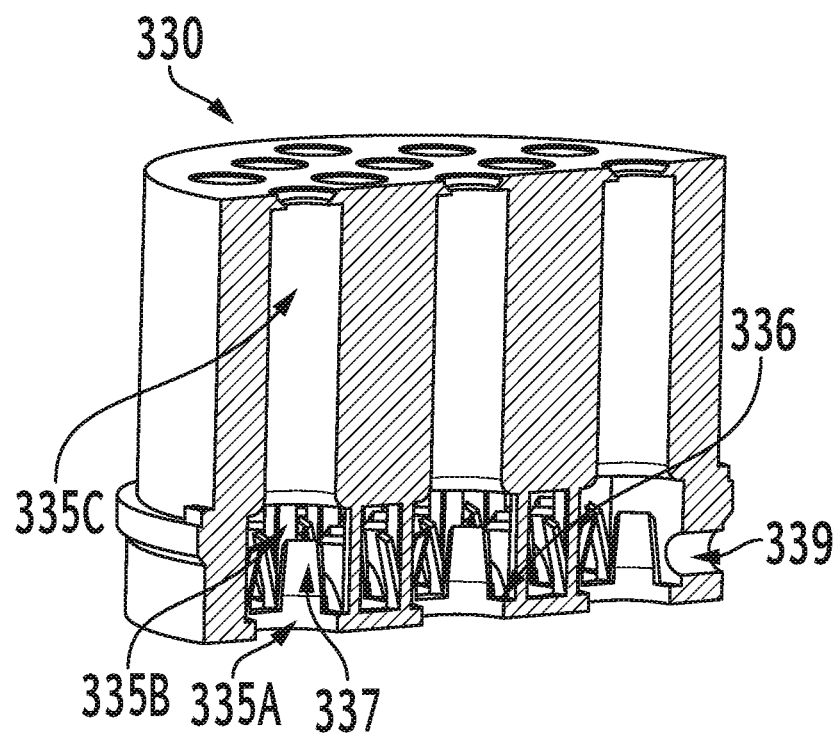
FIG. 11B illustrates another cross-sectional view of the exemplary insert component shown in FIG. 9.
Figure 11C:
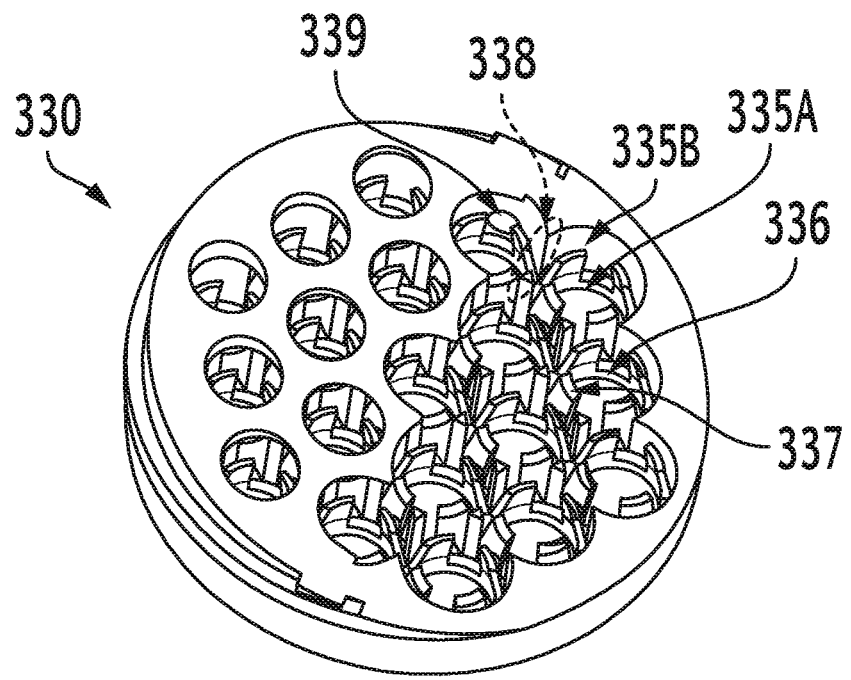
FIG. 11C illustrates another cross-sectional view of the exemplary insert component shown in FIG. 9.

FIG. 9 illustrates a perspective view of another exemplary insert component 330 of the present disclosure. FIG. 10 illustrates a cross-sectional view of the exemplary insert component 330 shown in FIG. 9 across plane C1-C2-C3-C4. FIG. 11A illustrates a cross-sectional view of the exemplary insert component 330 shown in FIG. 10 across L5-L6. FIGS. 11B and 11C illustrate more cross-sectional views of the exemplary insert component 330. Referring to FIGS. 9 to 11A, 11B, and 11C, the insert component 330 generally includes a component body 333 and a plurality of cavities 334 for receiving electrical contacts, and each cavity 334 penetrates the component body 333 along a longitudinal axis of the component body 333. The component body 333 has a first end 331 and a second end 332.

Each cavity 334 may include a plurality of cavity portions, some of which are designated as 335a, 335b, and 335c. A diameter D5B of the cavity portion 335b may be larger than a diameter D5A of the cavity portion 335a. A step 336 may be formed at the boundary of cavity portions 335a and 335b. A plurality of forks 337 may be formed on the step 336 and inside cavity portion 335b. The plurality of forks 337 may be sized and arranged to contact and hold an electrical contact inserted into the cavity 334. The number of forks 337 in a cavity 334 may be, for example, four; and can be any other suitable number.

The diameter D5B of the cavity portion 335b is larger than a distance D44 between centers of two adjacent cavities 334. Accordingly, the cavity portions 335b of adjacent cavities 334 overlap each other. That is, the cavity portions 335b of adjacent cavities 334 have an overlap region 338. The overlap region 338 provides at least one open path to connect a cavity 334 to another adjacent cavity 334, and serves as a passage path for the adjacent cavities 334. Such connection allows air or liquid (if introduced) to move freely between the connected cavities. The insert component 330 may further include one or more vent holes 339 that connect the cavities 334 to the outside of the insert component 330.

Accordingly, the cavities 334 of the insert component 330 are connected to each other, such that air or liquid (if introduced) may move freely among the connected cavities via the overlap regions 338 that serve as passage paths; and the cavities 334 may be vented to the outside of the insert component 330 via the vent holes 339.

The insert component 330 may be adapted for additive manufacturing by having the diameter D5B of a cavity portion 335B of each cavity 334 larger than a distance D44 between centers of adjacent cavities 334, so as to obtain overlap regions 338 of cavity portions 335B of adjacent cavities 334 as passage paths and adding one or more vent holes 339 that connect to one or more cavities 334. The overlap regions 338 and vent holes 339 of the insert component 330 may prevent vacuum buildup within the insert component during additive manufacturing and/or facilitate washing and processing of the insert component by using air (or any other suitable gas) or liquid after additive manufacturing.

Figure 12:
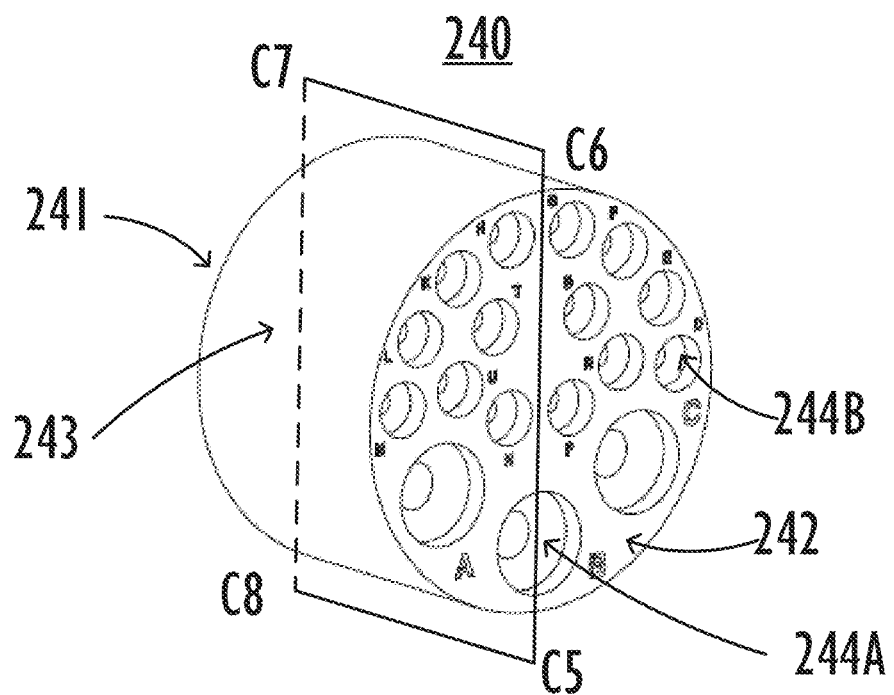
FIG. 12 illustrates a perspective view of another exemplary sealing member of the present disclosure.
Figure 13:
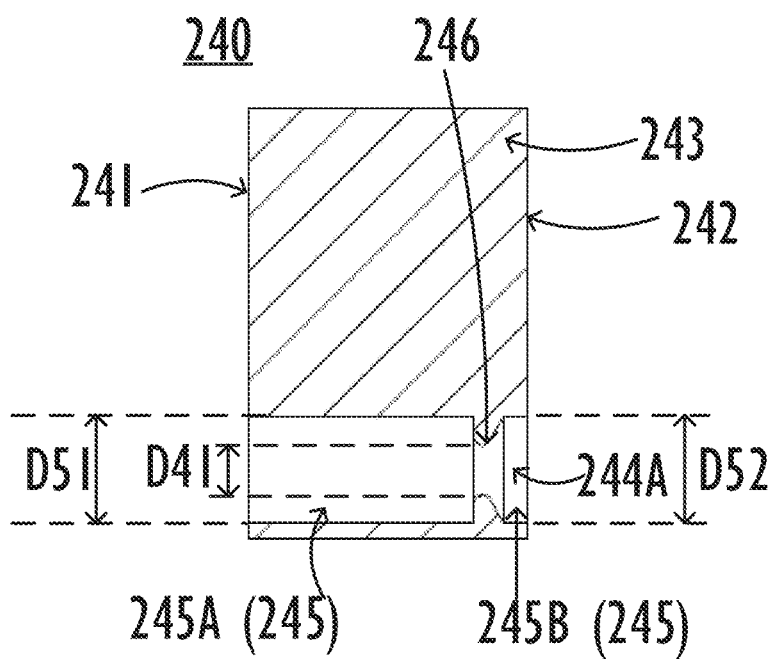
FIG. 13 illustrates a cross-sectional view of the exemplary sealing member shown in FIG. 12.

FIG. 12 illustrates a perspective view of another exemplary sealing member 240. FIG. 13 illustrates a cross-sectional view of the exemplary sealing member 240 shown in FIG. 12 across C5-C6-C7-C8. Referring to FIGS. 12 and 13, the sealing member 240 may be located adjacent the second end of the insert component and generally includes a sealing body 243 and a plurality of cavities 244a and 244b for inserting electrical contacts therein, and each cavity (244a, 244b) may penetrate the sealing body 243 along a longitudinal axis of the sealing body 243. The sealing body 243 has a first surface 241 and a second surface 242. The cavities 224a and 244b may be of different sizes to accommodate different sized contacts.

The cavity 244a and 244b may include one or more cavity portions 245a and 245b, and a singular wiper 246. The singular wiper 246 may seal against a received electrical contact (not shown in FIG. 13). The singular wiper 246 may be closer to the second surface 242 of the sealing member 240 than the first surface 241, and may be adjacent to the second surface 242 of the sealing member 240. The singular wiper 246 may be directly adjacent to and sandwiched between the cavity portions 245a and 245b, and may have one end in direct contact with the cavity portion 245a and have another end in direct contact with the cavity portion 245b. An inner dimension D41 of the singular wiper 246 may be smaller than an inner dimension D51 of the cavity portion 245a or an inner dimension D52 of the cavity portion 245b. For example, the singular wiper 246 has a smaller inner diameter than each one of the cavity portions 245a and 245b.

The singular wiper 246 may have an annular shape, e.g., across a plane perpendicular to the longitudinal axis of the sealing member 240. A cross-section of the singular wiper 246 across a plane parallel to the longitudinal axis of the sealing member 240 may include an arc. The sealing member 240 may be adapted for additive manufacturing by using the singular wiper 246 to accommodate stiffer elastomer materials available for additive manufacturing while allowing electrical contacts to be installed without excessive force.

Figure 14:
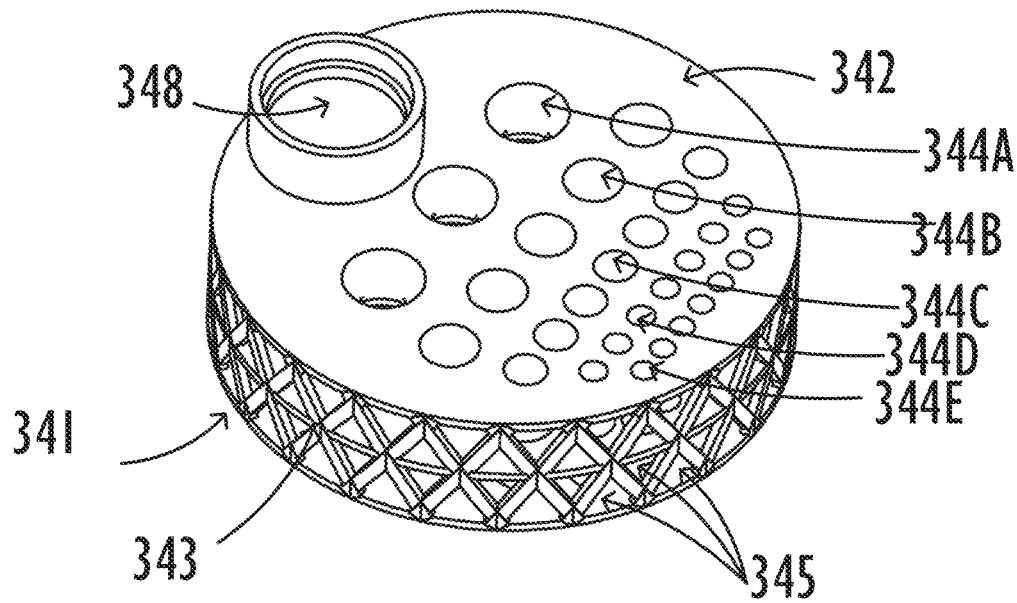
FIG. 14 illustrates a perspective view of another exemplary sealing member of the present disclosure.
Figure 15:
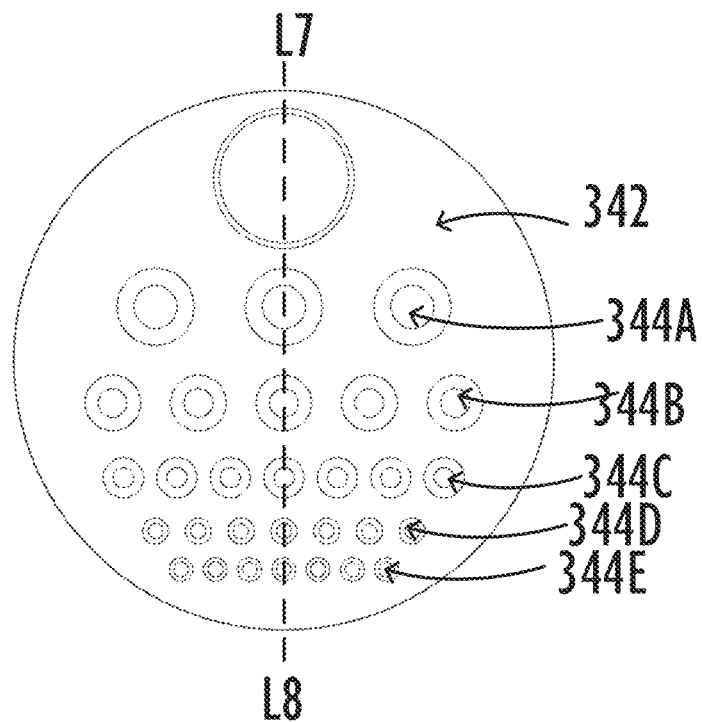
FIG. 15 illustrates an elevational view of the exemplary sealing member shown in FIG. 14.
Figure 16:
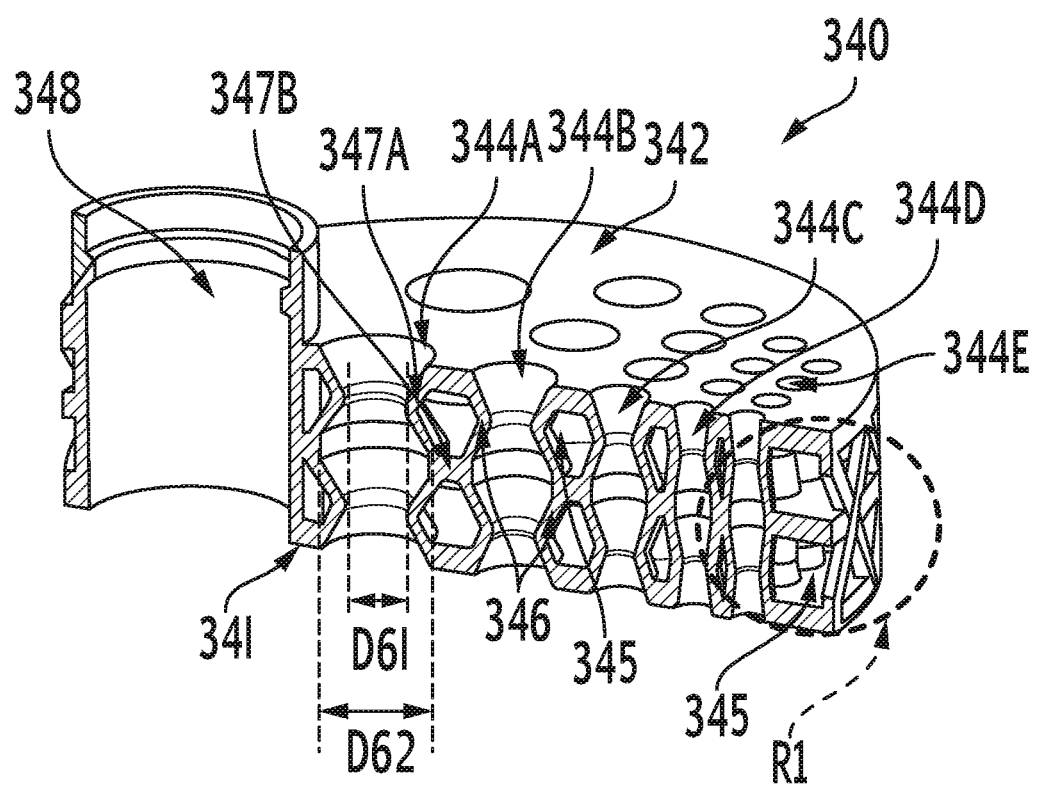
FIG. 16 illustrates a cross-sectional view of the exemplary sealing member shown in FIG. 15.

FIG. 14 illustrates a perspective view of another exemplary sealing member 340 of the present disclosure. FIG. 15 illustrates an elevational view of the exemplary second sealing member 340 shown in FIG. 14. FIG. 16 illustrates a cross-sectional view of the exemplary second sealing member 340 shown in FIG. 15 across L7-L8. Referring to FIGS. 14 to 16, the second sealing member 340 includes a sealing body 343 and a plurality of cavities 344 (344a, 344b, 344c, 344d, 344e) for inserting electrical contacts, and each cavity 344 may penetrate the sealing body 343 along a longitudinal axis of the sealing body 343. The cavities 344a, 344b, 344c, 344d, 344e may be of different sizes to accommodate different sized contacts. The sealing body 343 has a first surface 341 and a second surface 342.

The sealing member 340 may further include a plurality of pockets 345 in the body of the second sealing member 340 and being separated from the cavities (344a to 344e), such as pockets 345 in region R1 (circled region in FIG. 16) and other regions of the second sealing member 340. In some examples, the plurality of pockets 345 may include pockets 345 that follow a lattice order. In other examples, locations of the plurality of pockets 345 may be random, without following a specific order such as a lattice order. The pockets 345 may be air pockets. The sealing member 340 may be adapted for additive manufacturing with the pockets 345. With the pockets 345, the sealing member 340 may accommodate stiffer elastomer materials available for additive manufacturing, and have reduced stiffness and improved compressibility.

The sealing member 340 may further include a plurality of corrugation structures 346. The corrugation structures 346 may be sandwiched between the plurality of cavities 344a to 344e and the plurality of pockets 345, and accordingly, the corrugation structures 346 may have improved and increased flexibility. Accordingly, the plurality of cavities 344a to 344e may be separated from the plurality of pockets 345 by, e.g., the corrugation structures 346. The corrugation structure 346 may meander from the first surface 341 to the second surface 342. For example, the corrugation structure 346 may extend approximately in a zig-zag pattern from the first surface 341 to the second surface 342. The corrugation structure 346 may cause different in-plane dimensions in the cavities 344, such as in-plane dimension D61 and D62 in the cavity 344 and corresponding to different portions of the corrugation structure 346. The corrugation structure 346 may include one or more first portions 347 and one or more second portions 348, and the first portions 347 may protrude further towards the cavity 344 than the second portions 348. Accordingly, the in-plane dimensions D61 corresponding to the first portions 347 may be smaller than the in-plane dimensions D62 corresponding to the second portions 348. The in-plane dimensions D61 may be chosen such that the first portions 347 of the corrugation structure 346 contact and seal a received electrical contact; and further, the corrugation structure 346 may still allow the electrical contact to be inserted without excessive force, given the improved and increased flexibility of the corrugation structure 346 due to that the corrugation structures 346 are sandwiched between the plurality of cavities 344a to 344e and the plurality of pockets 345. Accordingly, the corrugation structures 346 may facilitate sealing of the electrical contacts inserted in the cavities 344. The sealing member 340 may further include a cavity 348 sized to receive an accessory sealing device or plug, such as may be necessary to provide sealing for electrical contacts of size 8 gauge or larger, where the length of the contact exceeds the length of the insert assembly.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as front, rear, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A 3-dimensional printed electrical connector, comprising:
an insert component including a body adapted for 3D printing, the body having first and second ends and including a cavity penetrating the body along a longitudinal axis of the body;
at least a first sealing member associated with the insert component and being adapted for 3D printing; and
a shell at least partially enclosing the insert component, the first sealing member has a first surface and a second surface, the second surface of the first sealing member being in contact with the first end of the insert component, and
wherein the first sealing member includes a plurality of tower structures on a first surface of the first seal, each of the plurality of tower structures including a base.

2. The connector of claim 1, wherein the body of the insert component is formed of rigid epoxy resin.

3. The connector of claim 1, wherein:
the cavity includes at least two cavity portions with different dimensions and at least one corner between adjacent cavity portions, and the insert component includes a clearance structure at the at least one corner.

4. The connector of claim 3, wherein:
the clearance structure has an annular shape; and
a cross-section of the clearance structure across a plane parallel to the longitudinal axis includes an arc.

5. The connector of claim 1, wherein:
the insert component includes a plurality of clearance structures in the cavity; and
centers of two adjacent clearance structures of the plurality of clearance structures have a distance therebetween in a direction along or parallel to the longitudinal axis.

6. The connector of claim 1, wherein the body of the insert component includes a dielectric material.

7. The connector of claim 1, wherein the insert component further includes a vent hole coupling the cavity to a space outside the body.

8. The connector of claim 1, wherein:
the cavity is a first cavity;
the insert component further includes additional cavities each penetrating the body along the longitudinal axis of the body; and
the insert component further includes a plurality of passage paths coupling the first and additional cavities to each other.

9. The connector of claim 1, further comprising:
a second sealing member having a first surface and a second surface, the first surface of the second sealing member being in contact with the second end of the insert component.

10. The connector of claim 9, wherein both of the first and second sealing members are elastomeric and insulating.

11. The connector of claim 9, wherein the second sealing member is at least twice as thick as the first sealing member.

12. The connector of claim 9, wherein:
the second sealing member includes a cavity for an electrical contact and penetrating through the second sealing member along the longitudinal axis and has, in the cavity of the second sealing member, a singular wiper adjacent to the second surface of the second sealing member.

13. The connector of claim 12, wherein the singular wiper has an annular shape.

14. The connector of claim 12, wherein a cross-section of the singular wiper across a plane parallel to the longitudinal axis includes an arc.

15. The connector of claim 12, wherein:
the cavity of the second sealing member includes a cavity portion adjacent to the singular wiper; and
an inner diameter of the singular wiper is smaller than an inner diameter of the cavity portion.

16. The connector of claim 9, wherein:
the second sealing member includes a body and a cavity for an electrical contact, wherein the cavity penetrates the body of the second sealing member; and
the second sealing member further includes a plurality of pockets in the body of the second sealing member, wherein the plurality of pockets are separated from the cavity.

17. The connector of claim 16, wherein the plurality of pockets follows a lattice order.

18. The connector of claim 16, wherein the plurality of pockets are arranged randomly.

19. The connector of claim 16, wherein the second sealing member further includes a corrugation structure between the cavity and one or more of the plurality of pockets.

20. A 3-dimensional printed electrical connector, comprising:
   an insert component including:
      a body with first and second ends, the body being adapted for 3D printing and being formed of rigid epoxy resin;
      a cavity penetrating the body along a longitudinal axis of the body; and
      a disposable part at the second end of the body; and
   a first sealing member having a first surface and a second surface, the second surface of the first sealing member being in contact with a first end of the insert component; and
   a second sealing member having a first surface and a second surface, the first surface of the second sealing member being in contact with a second end of the insert component,
   wherein the cavity includes at least two cavity portions with different dimensions and at least one corner between adjacent cavity portions, and
   wherein the insert component includes a clearance structure at the at least one corner.

21. The connector of claim 20, wherein the disposable part includes a cone-shaped hole connected to the cavity and forming a portion of the cavity.

22. The connector of claim 20, wherein:
   the cavity includes at least two cavity portions with different dimensions and at least one corner between adjacent cavity portions, and
   the insert component includes a clearance structure at the at least one corner.

23. A 3-dimensional (3D) printed electrical connector, comprising:
   an insert component including a body, the body being adapted for 3D printing and having first and second ends and including a cavity penetrating the body along a longitudinal axis of the body;
   a first sealing member having a first surface and a second surface, the second surface of the first sealing member being in contact with the first end of the insert component; and
   a second sealing member having a first surface and a second surface, the first surface of the second sealing member being in contact with the second end of the insert component, wherein:
   the cavity includes at least two cavity portions with different dimensions and at least one corner between adjacent cavity portions, and
   the insert component includes a clearance structure at the at least one corner.

* * * * *